United States Patent
Marotta et al.

[15] 3,650,770

[45] Mar. 21, 1972

[54] PULPY TEXTURED, STARCH CONTAINING FOOD SYSTEMS

[72] Inventors: Nicholas G. Marotta, Greenbrook; Harvey Bell, North Plainfield; Paolo C. Trubiano, Somerville, all of N.J.

[73] Assignee: National Starch and Chemical Corporation, New York, N.Y.

[22] Filed: June 25, 1969

[21] Appl. No.: 836,636

Related U.S. Application Data

[63] Continuation-in-part of Ser. No. 540,845, Apr. 7, 1966, abandoned.

[52] U.S. Cl. ..............................................99/139
[51] Int. Cl. .............................................A23l 1/14
[58] Field of Search.....................99/139, 124, 101, 144, 28, 99/69; 127/34

[56] References Cited

UNITED STATES PATENTS

| | | |
|---|---|---|
| 2,500,179 | 3/1950 | Hinz et al..............................99/139 |
| 2,613,150 | 10/1952 | Halden..................................99/139 |
| 3,086,890 | 4/1963 | Sarko et al............................127/69 |

Primary Examiner—Raymond N. Jones
Assistant Examiner—J. M. Hunter
Attorney—James and Franklin

[57] ABSTRACT

Preparation of starch containing food products exhibiting a grainy, pulpy texture, as well as the food products thus prepared, by admixing the non-starch ingredients of said food product with a cold water swelling, amylose containing starch product which has been pulverized to within a particle size range of no more than about 25 percent retained in a No. 12 mesh U.S. Standard Sieve and no more than about 60 percent by weight passing through a No. 100 mesh U.S. Standard Sieve and thereafter heating the resulting mixture at a temperature of at least about 160° F. so as to effect the swelling of the intact, starch particles therein.

6 Claims, No Drawings

PULPY TEXTURED, STARCH CONTAINING FOOD SYSTEMS

This application is a continuation-in-part of application Ser. No. 540,845, filed Apr. 7, 1966 now abandoned.

The appearance and overall consumer appeal of many processed food products is greatly enhanced when they are characterized by the presence of a pulpy texture. Such food products thus appear to retain much of their natural texture and, in so doing, exhibit a rich, highly concentrated appearance as opposed to the thick, pasty character which often results from the use of conventional starch thickeners. In addition, the presence of a pulpy texture is often accompanied by other improved properties of color and taste.

Various attempts have been made to impart this desirable pulpy texture to starch containing food products. One such method has involved the incorporation of cracker meal. However, the result of the latter technique is merely to disperse white flecks of cracker particles within the system while failing to impart either a good grain or a pulpy appearance to the resulting food product. In addition, the presence of the cracker meal detracts from the natural color of the food product. Another method, which is primarily used in baby foods, involves the incorporation of tapioca pearls therein. In this case, the extreme clarity and fragility of the pearls severely hamper the formation of a desirable pulpy texture within the food product.

It is the prime object of this invention to provide starch containing food systems with a grainy, pulpy texture. It is a further object to provide the latter characteristics via the use of starch products which exhibit an appropriate particle size and which will, more particularly, produce particles that remain intact both during and after additional processing of the resulting food product. Various other objects and advantages of this invention will become apparent to the practitioner from the following detailed description thereof.

We have now found that starch containing food products exhibiting a highly desirable grainy, pulpy texture can be readily prepared by incorporating pregelatinized, amylose-containing starch products into food systems, prior to the cooking and sterilization thereof. We have further found that the latter starch products are ideally suited for such usage by virtue of the fact that they are able to exhibit sufficient cold water swelling ability so that upon being cooked they will produce swollen discrete particles having an appropriate particle size along with excellent resistance to heat, acidity, and agitation which will permit these swollen particles to remain intact during any subsequent processing operations.

As previously noted, the starch products which may be used in the novel process of this invention comprise pregelatinized, amylose-containing cereal starches. The applicable starch bases which may be used in preparing these starch products comprise cereal starches selected from the group consisting of corn, wheat, and rice starches as well as the high amylose containing varieties of these sources, i.e., those which contain at least 50 percent, by weight, of amylose. Also included are the conversion products derived from any of the latter bases including, for example, dextrines prepared by the hydrolytic action of acid and/or heat; oxidized starches prepared by treatment with oxidants such as sodium hypochlorite; and, fluidity or thin boiling starches prepared by enzyme conversion or by mild acid hydrolysis. In addition, the amylose fraction derived from any available starch base may also be utilized. It is also possible to employ any substituted ether or ester derivative of these cereal starch bases or of their amylose fractions.

The method ordinarily used for producing cold water swelling starch products involves gelatinizing the starch, i.e., swelling and ultimately bursting the starch granules, and thereby enabling the resulting starch product to swell in water and eventually to produce discrete bulky particles. The gelatinization process preferably used, for purposes of this invention, is drum drying. In the latter procedure, an aqueous slurry of the amylose-containing starch is passed over heated rollers which raise the temperature of the slurry above the gelatinization point of the starch present therein while also evaporating the water therefrom so as to ultimately yield dry, solid particles of pregelatinized starch.

The drum drying conditions, e.g., temperature and drum speeds, under which the starch product is gelatinized and dried will, of course, vary according to the particular formulation, the degree and density of the desired granule swelling and the ultimate end-use application. In addition, it should be noted that the above described procedure may be varied by precooking the starch product, as by the use of a boiling water bath, a swept-surface heat exchanger or a jet cooker apparatus, prior to drum drying. The use of any of the latter procedures thus enables the practitioner to utilize lower drum temperatures and rotating speeds as well as to reduce the overall time required for the drum drying operation.

The starch products resulting from the drum drying process are in the form of thin, solid sheets which are then pulverized in order to provide particles of which no more than about 25 percent, by weight, will be retained on a No. 12 U.S. Standard Sieve, while no more than about 60 percent, by weight, will pass through a No. 100 U.S. Standard Sieve. Thus, the use of starch products which contain more than about 25 percent, by weight, of +12 material, i.e., particles which will be retained on a No. 12 mesh screen, will result in the formation of undesirably thick, unnatural textures in the final food products as opposed to imparting the desirable optimum grain-like pulpy texture. On the other hand, starch products which contain more than about 60 percent, by weight, of −100 material, i.e., particles which will pass through a No. 100 mesh screen, cannot provide the particles whose large size is the basis of the resulting pulpy textured effect.

Other mechanical means of accomplishing the latter gelatinization step, i.e., spray drying, flash drying and extrusion, etc., may also be utilized if so desired by the practitioner. It should be noted, however, that the drum drying procedure is most economical and efficient for purposes of this invention.

The resulting pregelatinized, amylose-containing starch products should now exhibit the properties which are required in order to enable them to provide the grainy, pulpy texture desired in the food products resulting from the novel process of this invention. Thus, being gelatinized, they are able to provide sufficient cold water swelling ability to produce discrete bulky particles during atmospheric cooking. In addition, they exhibit a proper mesh size and are sufficiently stable to permit their individual particles to withstand the heat, acidity, and agitation that may be encountered in subsequent food processing procedures.

Among the food products which can profit from the presence of the pregelatinized starch products produced according to the above procedure are: soups, tomato sauce, meat sauces, gravies, baby foods, puddings, cereals, fruit sauces such as apple sauce, fruit drinks such as pineapple drink, confections such as textured orange gum drops, and grainy textured baked goods such as cookies, crackers, pastries, and cakes. Thus, in a pineapple drink, for example, the presence of such starch products enables the resulting drink to exhibit the rich, natural, fibrous texture of the fresh pineapple.

In order to incorporate these starches into a food product, they may merely be put into the form of an aqueous slurry which should contain at least about 10 percent of water, as based on the total weight of components in the final food product. As an optional component, these slurries may also contain a conventional starch thickener, such as inhibited tapioca or a waxy maize starch; the resulting slurry, either with or without the conventional thickener, thereupon being added to the various non-starch, food base ingredients. It should be noted that when reference is made to "water" or "moisture" in the process of this invention, we contemplate the use of water either in its pure state or as the liquid vehicle of a fruit juice or milk, etc. Furthermore, when reference is made to the "non-starch" ingredients of our products, we contemplate such ingredients as fruits, meats, fish, seafoods, vegetables, flour, cereals, spices, flavors, sweeteners, colorings, and preservatives, etc.

In either instance, the resulting mixture is then heated at a temperature of at least about 160° F., thereby causing the pregelatinized starch product to swell and thus form the desired discrete bulky particles. In all cases, the starch containing food products resulting from the process of our invention will have a moisture content of at least about 5 percent, by weight.

The subject invention may, therefore, be described as a process comprising the steps of (1) admixing all of the individual non-starch ingredients of said food product with water and discrete, intact particles of a gelatinized, amylose-containing starch product, the particles of said starch product being capable of remaining intact during and after processing of the food product and being in pulverized form such that no more than about 25 percent, by weight, of its particles will be retained in a No. 12 mesh U.S. Standard Sieve and no more than about 60 percent, by weight, of its particles will pass through a No. 100 mesh U.S. Standard Sieve, the mixture thus prepared being characterized by a retention of the grain-like texture of the starch particles after the application of step 2 of said process and containing at least about 10 percent, by weight, of water; and, (2) thereupon heating the resulting mixture at a temperature of at least about 160° F., the heating thereby causing the pregelatinized, discrete starch particles to swell and thus impart the desired pulpy texture to the food product mixture.

Thus, it is to be stressed that prior to the application of this required heating step, which involves heating of the aqueous slurry at a minimum temperature of 160° F., the particles of our specified pregelatinized starch product which are contained within the latter aqueous slurry have not, as yet, swelled to any significant degree. In other words, until this heating step is applied, the particles of pregelatinized starch within the aqueous slurry have not yet swelled and thereby undergone the substantial increase in volume which is necessary in order to provide the thus heated mixture with its desired grainy, pulpy texture and which, at the same time, serves to substantially increase the viscosity of the slurry.

There is considerable significance inherent in the manner in which our process permits the admixture of our specified pregelatinized starches with water without affecting their swelling until a minimum temperature of about 160° F. is applied to the resulting aqueous slurry. Thus, if the starches utilized in our process did not behave in this manner but proceeded, instead, to immediately swell upon being admixed with water under room temperature conditions, it would be exceedingly difficult to prepare our desired grainy, pulpy textured food products on a full scale, commercial basis.

More particularly, if our starches were to swell and thereby substantially increase the viscosity of their aqueous slurries as soon as they were admixed with water under room temperature conditions, it would be quite difficult to thereafter uniformly heat the resulting viscous mass so as to attain the uniform high temperatures throughout this viscous mass which must be achieved in order to affect its sterilization. In other words, the highly viscous nature of such a slurry containing swollen particles of pregelatinized starch would present a heat transfer problem that would make it quite difficult to thereafter uniformly heat such a mass in order to insure its proper sterilization. On the other hand, such a heat transfer problem does not present itself in our novel process since, at the time at which heat is initially applied, our aqueous starch slurries have not undergone any swelling on the part of the starch particles contained therein.

The coarse particle size which is required in our specified starches plays a very significant part in the successful operation of our process. Thus, we were quite surprised to find that it was only by using pregelatinized starches having this required coarse grain size that we were able to provide aqueous slurries in which the starch particles would not immediately swell and thereby interfere with their subsequent sterilization as a result of the heat transfer problems involved when attempts are made to heat such highly viscous aqueous dispersions. Moreover, the fact that the grainy, pulpy texture of our products is successfully maintained under the high temperatures which are utilized in commercial sterilization procedures is also quite surprising and unexpected. The latter behaviour, on the part of our starches, is demonstrated in Example III hereinbelow.

It is also to be pointed out that we were entirely unconcerned with using pregelatinized starches because of their ability to disperse in unheated water. Rather, we were surprised to find that it was only by the use of pregelatinized starches that we were able to prepare starch products whose particle size would be within the range necessary for them to display the properties required for use in our process so as to be able to result in the preparation of our desired grainy, pulpy textured food products. Thus, as known to those skilled in the art, commercial starches are ordinarily prepared by means of so-called wet milling procedures which yield the starch in the form of a powder whose grain size is substantially finer than that which would be required to permit their use in our products. However, when such commercially prepared starches are drum dried in order to convert them into pregelatinized form, they emerge, as noted earlier, as solid sheets which may then be conveniently pulverized into a coarse particle size within our specified range. In other words, it was our discovery of this ability on the part of pregelatinized starches to be pulverized to within their specified particle size range and not the ability of such starches to be dispersed in water under room temperature conditions which led us to utilize them in the process of our invention.

As previously mentioned, the resulting swollen particles of the pregelatinized starch products specified for use in our process are not adversely affected by any of the food processing, and particularly the sterilization, techniques to which the food products containing the latter starches will subsequently by subjected when they are to be packaged in sealed containers such as tin cans or glass jars. Such sterilization techniques include stationary cooking and retorting, i.e. pressure cooking at a combination of temperatures and pressures in excess of about 212° F. and one atmosphere; the latter method being of particular significance in the food industry. In addition, food systems having pH levels below about 4.5 are frequently sterilized by being cooked, at atmospheric pressure, at temperatures less than about 100° C. The latter procedure is ordinarily used in the sterilization of fruit containing food products.

The amount of grain introduced into any particular food product may be left to the discretion of the practitioner. Such preference will, of course, depend on the natural characteristics of the basic food constituent as well as on the nature of the food formulation being prepared. The amount of grain present in the resulting food product may be determined by initially controlling the addition level of the pregelatinized starch products as well as the average particle size of the latter starch products. Thus, for example, typical values for pineapple sauces would include a concentration of from about 0.5 to 15 percent, by weight, of a pregelatinized starch of which about 95 percent, by weight, of the particles are capable of passing through a No. 12 U.S. Standard Sieve but about 80 percent, by weight, of which will be retained on a No. 100 U.S. Standard Sieve; the lower concentrations being used in fluid drinks or thin sauces while the higher concentrations are applicable to heavier-bodied, "spoonable" sauces.

Needless to say, the desired grainy texture will not be adversely affected by the inclusion in the food products of this invention of such additives as sweetening, coloring and flavoring agents.

In the following examples, which further illustrate the embodiment of this invention, all parts given are by weight unless otherwise specified.

EXAMPLE I

This example illustrates the preparation of a food system typical of the products of this invention which in this case was a pineapple sauce characterized by its permanent grainy, pulpy texture.

The following ingredients were utilized in the preparation of the pineapple sauce formulation of this example.

| | parts |
|---|---|
| pineapple juice | 100 |
| high amylose corn starch containing 70%, by weight, of amylose, which had been mixed with 2 parts of water and pregelatinized and dried on heated drums for about 30 minutes at a drum temperature of 300° F., and pulverized so as to obtain a product exhibiting 5%, by weight, of particles retained on a No. 12 mesh screen and 20%, by weight, of particles passing through a No. 100 mesh screen | 10 |
| sugar | 25 |

The starch was dry blended with the sugar and then dispersed in the pineapple juice. The resulting slurry was thereupon cooked at a temperature of 190° F. for a period of 5 minutes. The resulting hot sauce was then introduced into No. 2 cans which were sealed and cooled.

Since the pH of the resulting pineapple sauce was at a level of 3.4, no additional sterilization was required; the initial cooking procedure serving both to produce the desired pulpy texture as well as to sterilize the food product.

The resulting pineapple sauce was found to exhibit an excellent, natural pulp-like texture as well as a natural, light-yellow color. There was no evidence of particle deterioration as a result of the sterilization procedure. In addition, neither stirring nor agitation disrupted the conformation of the swollen particles.

EXAMPLE II

This example illustrates the necessity for utilizing only the particular starch products previously designated for use in the process of this invention in order to achieve the desired grainy, pulpy texture in the final food product.

The identical procedure utilized in Example I, hereinabove, was employed to prepare the pineapple sauce formulation of this example with the exception that the pregelatinized cereal starch was eliminated and 10 parts of a waxy maize starch substituted therefor.

The resulting pineapple sauce did not exhibit the grainy, pulpy texture evident in the pineapple sauce prepared by means of the process of this invention, as described in Example I. In contrast, it exhibited an unappealing, heavy, pasty texture.

It thus becomes obvious that in order to prepare a food product with a stable grainy texture, it is essential that an amylose-containing, pregelatinized cereal starch product, as specified in this invention, be present therein.

EXAMPLE III

This example illustrates the ability on the part of the starches utilized in the pulpy textured food products produced by the process of this invention to withstand disintegration during subsequently encountered processing operations.

In order to determine the stability of the grain effect imparted by various starches, the following test procedure was utilized:

Part A - A dry blend of 7.5 parts of the specified starch and 7.5 parts of sugar was admixed with 200 parts of distilled water. The resulting slurry was then cooked to a temperature of 190° F., immediately diluted with 200 parts of water and poured over a tared No. 20 U.S. Standard Sieve. The material retained on the screen was then thoroughly washed, dried and weighed.

Part B - Thereupon, a second portion of the above prepared cooked slurry was poured into a No. 2 can, which was sealed and retorted. i.e., pressure cooked, at a temperature of 245° F. and a pressure of 15 p.s.i. for a period of 30 minutes. The can was then cooled for 30 minutes and its contents diluted with 200 parts of water. The resulting slurry was poured over a tared No. 20 U.S. Standard Sieve; the material retained thereon then being washed, dried and weighed.

The presence, as determined by the method of Part A, of +20 particles, i.e. particles which were retained on the No. 20 mesh screen, and the subsequent retention of a predominant portion of these particles in their initial bulky form and/or an increase of bulkiness in additional particles, as shown by the results of the procedure of Part B, is indicative of the fact that these starch products are capable of providing satisfactory pulpy textured food products which will not be deleteriously affected by retorting conditions.

The following table lists the various amylose containing, pregelatinized starches which were tested and provides information relating to the pulpy textured products resulting from their use. It should be noted that these starches were drum dried and pulverized by means of the procedure referred to in the description of the starch product utilized in Example I.

| Starch | parts of +20 material in Part A | parts of +20 material in Part B |
|---|---|---|
| pregelatinized, high amylose corn starch (55%, by weight, of amylose) | 1.0 | 2.5 |
| pregelatinized, high amylose corn starch (70%, by weight, of amylose) | 1.5 | 5.5 |
| pregelatinized amylose (derived from the fractionation of potato starch) | 3.8 | 8.0 |
| pregelatinized corn starch | 1.5 | 0.5 |

The above data clearly indicates the excellent pulpy textured products resulting from the use of the specified pregelatinized, amylose-containing starches of this invention. It also illustrates the excellent stability of these pulpy textured particles upon being subjected to retorting conditions.

EXAMPLE IV

This example illustrates the preparation of additional food products of this invention characterized by their excellent pulpy textures.

A. Tomato Sauce

The following ingredients were utilized in the preparation of the tomato sauce formulation of this example.

| | parts |
|---|---|
| tomato paste | 177.0 |
| pregelatinized corn starch | 14.5 |
| sugar | 14.5 |
| water | 305.2 |

The above described starch was dry blended with the sugar and then dispersed in 100 parts of water. Under agitation, the tomato paste was then added to the remaining amount of water so as to achieve a mixture having a uniform consistency. Both slurries were then admixed and the resulting blend was thereupon cooked for 5 minutes at a temperature of 190° F. The resulting hot sauce was then canned, at elevated temperatures, and the sealed cans retorted, i.e., pressure cooked, for 25 minutes at a temperature of 245° F. and a pressure of 15 p.s.i.

The resulting tomato sauce was found to exhibit an excellent, natural pulp-like texture as well as a natural red color.

B. Dessert Pudding

A blend of 7.5 parts of a pregelatinized, high amylose corn starch (55 percent, by weight, of amylose) and 25 parts of sugar was admixed with 100 parts of whole milk. This mixture was heated to 190° F. for a period of 5 minutes. When cooked, the resulting material provided a pulpy textured pudding product.

C. Baby Cereal

The following ingredients were utilized in this formulation:

| | parts |
|---|---|
| pitted prunes | 10.0 |
| pregelatinized corn starch | 7.5 |
| sugar | 10.0 |
| salt | trace |
| whole milk | 100.0 |

In this preparation, the solid ingredients were blended and then admixed with the milk. The resulting mix was then heated to 190° F. for a period of 5 minutes. The cereal product resulting from this procedure exhibited an appealing pulpy texture.

The cereal product of this example was also prepared by simply admixing the pre-blended solid ingredients with milk which had previously been heated to a temperature of 190° F. In this instance, the resulting cereal product also exhibited a granular texture which was appealing both to the eye and to the palate.

Summarizing, it is seen that this invention provides for the preparation of food products characterized by a highly desirable grainy, pulpy texture.

Variations may, of course, be made in proportions, procedures, and materials without departing from the scope of this invention which is defined by the following claims.

We claim:

1. A process for the preparation of a starch containing food product having a grainy pulpy texture, said process comprising the steps of (1) admixing all of the individual non-starch ingredients of said food product with water and discrete, intact particles of a gelatinized, amylose-containing starch product, the particles of said starch product being capable of remaining intact during and after processing of the food product and being in pulverized form such that no more than about 25 percent, by weight, of its particles will be retained in a No. 12 mesh U.S. Standard Sieve and no more than about 60 percent, by weight, of its particles will pass through a No. 100 mesh U.S. Standard Sieve, the mixture thus prepared being characterized by not having swelled to any significant degree and by a retention of the grain-like texture of the starch particles after the application of step 2 of said process and containing at least about 10 percent, by weight, of water; and, (2) thereupon heating the resulting mixture at a temperature of at least about 160° F., the heating thereby causing the pregelatinized, discrete starch particles to swell and thus impart the desired pulpy texture to the food product mixture.

2. The process of claim 1, wherein said amylose-containing starch product is selected from the group consisting of amylose, cereal starches, and cereal starches containing at least 50 percent, by weight, of amylose.

3. The process of claim 1, in which the heated resulting mixture of step (2) is rendered sterile by subjecting the same to a temperature of at least about 212° F. and a pressure of at least one atmosphere.

4. The process of claim 1, in which the said resulting mixture has a maximum pH at a level of about 4.5 and is heated at a temperature of at least about 160° F. so as to effect the swelling of the starch particles therein and the sterilization thereof.

5. The process of claim 4, wherein said amylose-containing starch product is selected from the group consisting of amylose, cereal starches, and cereal starches containing at least 50 percent, by weight, of amylose.

6. The starch containing food product resulting from the process of claim 1.

* * * * *